Patented Apr. 29, 1941

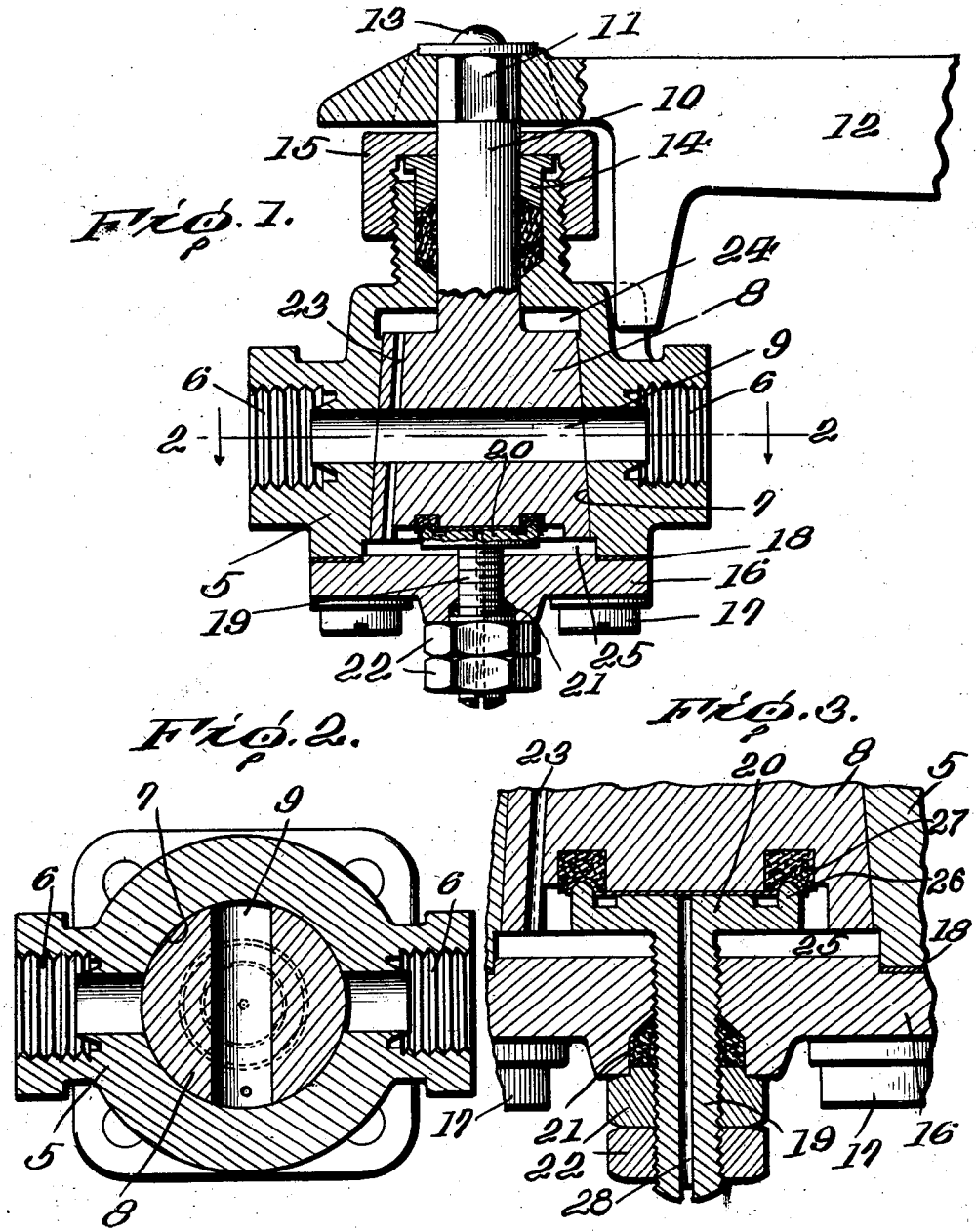

2,239,795

UNITED STATES PATENT OFFICE 2,239,795

BALANCED PLUG VALVE

Arthur L. Parker, Cleveland, Ohio

Application May 4, 1936, Serial No. 77,842
Renewed April 6, 1939

2 Claims. (Cl. 251—98)

This invention relates to a balanced plug valve which has been perfected with special reference to its use in controlling fluid under high pressure.

The primary object of the invention is to provide a valve of this type which may be adjusted to its seat without regard to the pressure of the fluid to be controlled. In other words, the fluid pressure on the valve is substantially balanced, or the pressure tending to unseat the valve may be slightly greater than the pressure on the opposite side, so that the valve may be turned very easily, even though the fluid is under very high pressure.

The invention further comprises various details of construction, which will be more particularly explained in connection with the accompanying drawing, in which—

Figure 1 is a central longitudinal sectional view of the invention, with the valve open.

Figure 2 is a section taken on the line 2—2 of Figure 1, with the valve closed.

Figure 3 is an enlarged detail sectional view of the adjusting screw and vent.

As illustrated in the drawing, the valve is disposed within a casing 5, which has threaded openings 6, for connection to the pipe line in which the valve is used. The interior of the casing 5 is formed with a tapered bore 7 adapted to receive a correspondingly tapered plug 8 formed with a transverse bore 9, which may be brought into registry with the openings 6, as shown in Figure 1, to open the valve, or may be disposed as shown in Figure 2 to close the valve.

The smaller end of the plug 8 is extended outwardly of the casing, as at 10, and is provided with a non-circular end 11, to which a handle 12 is secured by a screw 13 or other suitable means. The extension 10 is provided with a packing gland 14, which may be adjusted by a nut 15. A cover plate 16 is secured to the casing by screws 17 or the like and is provided with a gasket 18.

For adjusting the valve to its seat with a definite pressure, an adjusting screw 19 is disposed centrally of the plate 16 and is formed with a head 20, which bears against the end of the plug 8. The screw 19 is provided with packing 21 and lock nuts 22.

A small hole 23 is drilled lengthwise of the plug 8, intersecting the bore 9, so that the sealed chambers 24 and 25, at opposite ends of the plug, are subject to the line pressure. The size of the head 20 is so determined that the entire area of pressure upon the larger end of the plug is equal to or less than the area of pressure upon the smaller end, so that the pressure of the fluid upon the valve will tend to free the valve, or at least will not force it more tightly into its seat. With the proper adjustment of the screw 19, therefore, and the proper proportioning of the areas exposed to opposite pressures, a perfectly tight easily turned valve may be secured, even in lines of very high pressure, say 500 to 1000 pounds. The hole 23 absolutely prevents possible accumulation of excess pressure against the larger end of the valve.

The head 20 is formed with a peripheral rib 26, which engages a gasket 27 countersunk in the end of the plug 8 to make a pressure tight seal. As the screw 19 is tightened, the gasket 27 is compressed and at the same time the center of the head 20 bears against the plug to provide a good turning surface without imposing too much compression upon the gasket. A vent 28 is provided through the screw 19 to permit the escape of any air which may be trapped within the rib 26 as the valve is adjusted against its seat, so that there is no pressure developed upon the valve inside of this rib. Inasmuch as the peripheral rib 26 engages a gasket and the head 20 merely bears against the plug to provide a good turning surface, the valve is free to seat itself properly. In other words, there is no positive centering means at the bottom of the plug, as viewed in the drawing, to interfere with the seating of the tapered surface.

From the foregoing description, it will be seen that I have provided a valve which may be adjusted to its seat with precision and the adjustment will not be appreciably affected by high pressures in the line. Although I have shown and described in detail the preferred form of the invention, it will be understood that this is merely for the purpose of illustration and that the invention also includes such modifications as fall within the scope of the appended claims.

Having thus described the invention, what I claim as new and desire to secure by Letters Patent is:

1. The combination with a valve casing, of a tapered plug valve seated therein and formed with a fluid channel, chambers at opposite ends of the valve in communication with said channel, an adjusting screw having a head bearing against the larger end of the valve to adjust the pressure of the valve against its seat, a circular rib on the periphery of said head, a gasket cooperating with said rib to define an annular fluid pressure area on the larger end of the valve which is not greater than the fluid pressure area on the smaller end of the valve, and a vent through said adjusting screw to permit the escape of any fluid which may be trapped within said rib.

2. The combination with a valve casing, of a tapered plug valve seated therein and formed with a fluid channel, chambers at opposite ends of the valve in communication with said channel, an adjusting screw having a head bearing against the larger end of the valve to adjust the pressure of the valve against its seat, and means constituting a fluid tight seal between the periphery of said head and the valve, the surface of said head within the seal being vented to the atmosphere, thereby defining an annular fluid pressure area on the larger end of the valve which is not greater than the fluid pressure area on the smaller end of the valve.

ARTHUR L. PARKER.